US009838923B1

(12) United States Patent
Sitton et al.

(10) Patent No.: US 9,838,923 B1
(45) Date of Patent: Dec. 5, 2017

(54) TRANSMITTING DATA OVER A RADIO ACCESS TECHNOLOGY

(71) Applicant: BlackBerry Limited, Waterloo (CA)

(72) Inventors: Renato Sitton, Ottawa (CA); Sarabjeet Singh Sidhu, Ottawa (CA); Kwong Hang Kevin Chan, Kanata (CA); Muhammad Khaledul Islam, Ottawa (CA); Gordon Peter Young, Leamington Spa (GB); Thomas Leonard Trevor Plestid, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 15/256,301

(22) Filed: Sep. 2, 2016

(51) Int. Cl.
  *H04W 36/00* (2009.01)
  *H04W 36/14* (2009.01)
  *H04W 76/06* (2009.01)
  *H04W 48/16* (2009.01)
  *H04W 88/02* (2009.01)
  *H04W 88/08* (2009.01)

(52) U.S. Cl.
  CPC ....... *H04W 36/0055* (2013.01); *H04W 36/14* (2013.01); *H04W 48/16* (2013.01); *H04W 76/06* (2013.01); *H04W 88/02* (2013.01); *H04W 88/08* (2013.01)

(58) Field of Classification Search
  CPC .................................................. H04W 36/0055
  USPC .................................................. 455/436–448
  See application file for complete search history.

(56) References Cited

PUBLICATIONS

ETSI TS 36.331, "LTE; Evolved Universal Terrestrial Radio Access (E-UTRA); Radio Resource Control (RRC); Protocol specification," version 13.0.0, Release 13, Jan. 2016, 670 pages.
ETSI TS 36.304, "LTE; Evolved Universal Terrestrial Radio Access (E-UTRA); User Equipment (UE) procedures in idle mode," version 13.0.0, Release 13, Feb. 2016, 44 pages.

*Primary Examiner* — Joel Ajayi
(74) *Attorney, Agent, or Firm* — Fish & Richardson P.C.

(57) ABSTRACT

Systems, methods, and software can be used to transmit data over a radio access technology (RAT). In some aspect, a data transmission using a first radio access technology (RAT) is initiated at a mobile device. A timer is started at a first value. When the timer expires, it is determined that data remains to be transmitted. In response to determining that data remains to be transmitted: the data transmission is suspended, and a search is initiated for a second RAT for transmitting the remaining data. The second RAT provides a higher data rate than the first RAT.

17 Claims, 6 Drawing Sheets

FIG. 4   400

```
-- ASN1START

RLF-TimersAndConstants-r9     ::=     CHOICE {
    release                           NULL,
    setup                             SEQUENCE {
        t301-r9                           ENUMERATED {
                                              ms100, ms200, ms300, ms600, ms1000, ms1500,
                                                  ms2000 },
        t310-r9                           ENUMERATED {
                                              ms0, ms50, ms100, ms200, ms500, ms1000, ms2000
        n310-r9                           ENUMERATED {
                                              n1, n2, n3, n4, n6, n8, n10, n20 },
        t311-r9                           ENUMERATED {
                                              ms1000, ms3000, ms5000, ms10000, ms150000,
                                                  ms20000, ms30000},
        n311-r9                           ENUMERATED {
                                              n1, n2, n3, n4, n5, n6, n8, n10 },
        ...
    }
}
RLF-TimersAndConstantsSCG-r12 ::=     CHOICE {
    release                           NULL,
    setup                             SEQUENCE {
        t313-r12                          ENUMERATED {
                                              ms0, ms50, ms100, ms200, ms500, ms1000, ms 2000},
        n313-r12                          ENUMERATED {
                                              n1, n2, n3, n4, n6, n8, n10, n20 },
        n314-r12                          ENUMERATED {
                                              n1, n2, n3, n4, n6, n8, n10 },
        ...
    }
}
RLF-TimersAndConstants-r14    ::=     CHOICE {
    release                           NULL,
    setup                             SEQUENCE {
        t31x-r14                          ENUMERATED {
                                              s30, s60, s90, s120, s240, s480, s960} ,
        ...
    }
}
-- ASN1STOP
```

| *RLF-TimersAndConstants* field descriptions*n3xy* |
|---|
| *n3xy*<br>Constants are described in section 7.4. n1 corresponds with 1, n2 corresponds with 2 and so on. |
| *t3xy*<br>Timers are described in section 7.3. Value ms0 corresponds with 0 ms, ms50 corresponds with 50 ms and so on. Whereas value s30 corresponds with 30 seconds, s60 corresponds with 60 seconds and so on. |

```
-- ASN1START                                                                      500
                                                                                  ↙
PDCP-Config  ::=                     SEQUENCE {
       discardTimer                      ENUMERATED {
                                             ms50, ms100, ms150, ms300, ms500
                                             ms750, ms1500, infinity
       }                                                 OPTIONAL,  --Cond Setup
       rlc-AM                            SEQUENCE {
            statusReportRequired             BOOLEAN
       }                                                 OPTIONAL,  --Cond Rlc-AM
       rlc-UM                            SEQUENCE {
            pdcp-SN-Size                     ENUMERATED {len7bits, len12bits}
       }                                                 OPTIONAL,  --Cond Rlc-UM
       headerCompression                 CHOICE {
            notUsed                          NULL,
            rohc                             SEQUENCE {
                 maxCID                          INTEGER (1..16383)    DEFAULT 15,
                 profiles                        SEQUENCE {
                      profile0x0001                   BOOLEAN,
                      profile0x0002                   BOOLEAN,
                      profile0x0003                   BOOLEAN,
                      profile0x0004                   BOOLEAN,
                      profile0x0005                   BOOLEAN,
                      profile0x0001                   BOOLEAN,
                      profile0x0002                   BOOLEAN,
                      profile0x0003                   BOOLEAN,
                      profile0x0004                   BOOLEAN,
                 },
                 ...
            }
       },
       ...,
       [[ m-IntegrityProtection-r10       ENUMERATED {enabled} OPTIONAL    --Cond RN
       ]],
       [[ pdcp-SN-SIZE-v1130   4          ENUMERATED {len15bits}    OPTIONAL    --Cond Rlc-AM2
       ]],
       [[ ul-DataSplitThreshold-r13       BOOLEAN    OPTIONAL,    --Need ON
            t-Reordering-r12                 ENUMERATED {
                                             ms0, ms20, ms40, ms60, ms80, ms100, ms120, ms140,
                                             ms160, ms180, ms200, ms220, ms240, ms260, ms280, ms300,
                                             ms500, ms750, spare14,. spare13, spare12, spare11, spare10,
                                             spare9, spare8, spare7, spare6, spare5, spare4, spare3,
                                             spare2, spare 1}     OPTIONAL    --Cond SetupS
       ]],
       [[ ul-DataSplitThreshold-r13       CHOICE {
            release                          NULL,
            setup                            ENUMERATED {
                                             b0, b100, b200, b400, b800, b1600, b3200, b6400, b12800,
                                             b25600, b51200, b102400, b204800, b409600, b819200,
                                             spare1}
```

FROM FIG. 5A

```
    }
    pdcp-SN-Size-v13xx         ENUMERATED {len18bits}      OPTIONAL,    --Need ON
                                                           OPTIONAL,    --Cond Rlc-AM3
  ]],
  [[ t-backoffT3-r14           ENUMERATED {
                                 s30, s60, s90, s120, s240, s480, s960, spare1},
     BackoffThreshold-r14      ENUMERATED {
                                 kB0, kB100, kB200, kB800, kB1600, kB6400, kB12800,
                                 spare1}

]]
}
```

--ASN1STOP

| *PDCP-Config* field descriptions*discardTimer* |
| --- |
| *discardTimer*<br>Indicates the discard timer value specified in TS 36.323 [8]. Value in milliseconds. Value ms50 means 50 ms, ms100 means 100 ms and so on. |
| *t-Reordering*<br>Indicates the value of the reordering timer, as specified in TS 36.323 [8]. Value in milliseconds. Value ms0 means 0 ms, ms20 means 20 ms and so on. |
| *ul-DataSplitThreshold*<br>Indicates the threshold value for uplink data split operation specified in TS 36.323 [8]. Value b100 means 100 Bytes, b200 means 200 Bytes and so on. E-UTRAN only configures this field for split DRBs. |
| *t-backoffT3*<br>Indicates the backoff timer T3 used on the low rate RAT to determine the start of a search window opportunity for devices transmitting data on the low rate RAT, wherein during the search window the device may initiate a search or scan to enable recovery to an EUTRAN |
| *BackoffThreshold-r14*<br>Indicates threshold value to be used when evaluating to apply T3 backoff timer for search window opportunities following fall back to low rate RAT following RLF on EUTRAN. |

FIG. 5B

TRANSMITTING DATA OVER A RADIO ACCESS TECHNOLOGY

TECHNICAL FIELD

The present disclosure relates to relates to data transmission in communication systems and, more specifically, to transmitting data over a radio access technology (RAT).

BACKGROUND

A radio access technology (RAT) can be used to provide data transmissions over a communication network. Different types of RATs can provide different data rates or throughputs for data transmission. For example, a higher rate RAT such as 4th generation (4G) RATs, e.g., long term evolution (LTE) or LTE-Advanced (LTE-A), can provide higher data rates for a mobile device to transmit or receive data over the network. On the other hand, a second generation (2G) or a third generation (3G) RAT, e.g., Global System for Mobile communication (GSM), General Packet Radio Service (GPRS), Enhanced Data rates for GSM Evolution (EDGE), Interim Standard 95 (IS-95), Code Division Multiple Access (CDMA)2000, Evolution-Data Optimized (EVDO), or Universal Mobile Telecommunications System (UMTS), typically provides data rates that are lower than that of the 4G RAT.

DESCRIPTION OF DRAWINGS

FIG. 4 illustrates an example IE that can be used to indicate T3 values.

FIGS. 5A and 5B illustrate an example IE that can be used to indicate data thresholds and T3 values.

Like reference numbers and designations in the various drawings indicate like elements.

DETAILED DESCRIPTION

Figure 1:
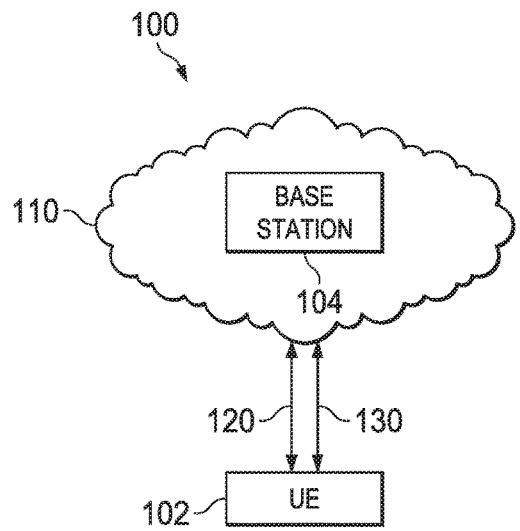
FIG. 1 illustrates an example communication system that transmits data over a RAT according to an implementation.

When a new radio access technology (RAT) is initially rolled out, the coverage provided by the network for the new RAT may have coverage holes. Coverage holes may continue to exist during the lifetime of the radio access technology deployment if suitable new wireless links are not located in the near or adjacent locations to provide continuous coverage.

In a Long Term Evolution (LTE) network, if a user equipment (UE) detects that it has lost radio coverage, a recovery procedure can be triggered by the UE to recover the radio connectivity, re-establish the Radio Resource Control (RRC) signaling protocol, and resume data transmission on the LTE RAT. The recovery procedure can be triggered by a lower layer (e.g. physical layer) indication of loss of the physical (radio) layer, leading to a determination of Radio Link Failure (RLF). During this procedure the UE may start a re-establishment timer T311, during which the UE can attempt to discover and re-establish its RRC Connection with the LTE network in order to continue with its data transmission.

If the UE is unable to find a suitable LTE (e.g. Evolved Universal Terrestrial Radio Access (EUTRA) Network (EU-TRAN)) cell with which to re-establish its connection before timer T311 expires, on expiry of the timer the UE can leave the radio resource control (RRC) connected mode and return to the RRC idle mode. The UE can indicate this state change to the higher layers including an indication that it was caused by loss of radio coverage following a radio link failure. The UE can then perform cell selection for a suitable cell on EUTRAN or any other RAT supported by the UE. In some cases, a suitable cell can be selected using procedures described in Third Generation Partnership Project (3GPP) Technical Specification TS36.304.

In some cases, following the failure to re-establish its connection, rather than allow the UE to select a suitable cell on another RAT a hysteresis back-off timer can be implemented to prevent the data session from moving to another or lower throughput RAT. This will enable the UE to prolong the search for a suitable cell on the higher rate or initial RAT. For example the UE may discover a particular suitable cell on a RAT that is different than the higher rate or initial RAT where the coverage was initially lost, but whilst the hysteresis back-off timer is running the UE is prevented from selecting this particular suitable cell until the back-off timer expires. In the meantime the UE continues to search for other suitable cells, and in the case of detecting a suitable cell of the higher rate or initial RAT the UE selects this suitable cell and stops the hysteresis back-off timer. This approach can also reduce excessive signaling with the network for RAT switching, especially when the higher and lower throughput RATs do not share the same Packet Core Infrastructure, e.g., between a CDMA network and an LTE network. The hysteresis back-off timer, however, may affect the user experience because the user is stuck without an active data service when the hysteresis back-off timer is running. In some implementations, this timer can be set to a relatively high value, e.g. 200 seconds, which means a loss of data service for approximately 3-4 minutes if the UE loses LTE coverage while in the coverage of only a CDMA RAT, for example.

In some cases, once a data session has moved to the lower throughput RAT, the data call may be maintained on the lower throughput RAT for the duration of the ongoing data session until the data in the transmission queue is transmitted. For a multi-RAT UE implementing a single transceiver for multiple RATs, since the lower throughput RAT provides a lower data rate, it may take a long period of time for the UE to complete the data transmission and return to idle mode, and then being able to perform another RAT search and selection procedure.

Figure 2:
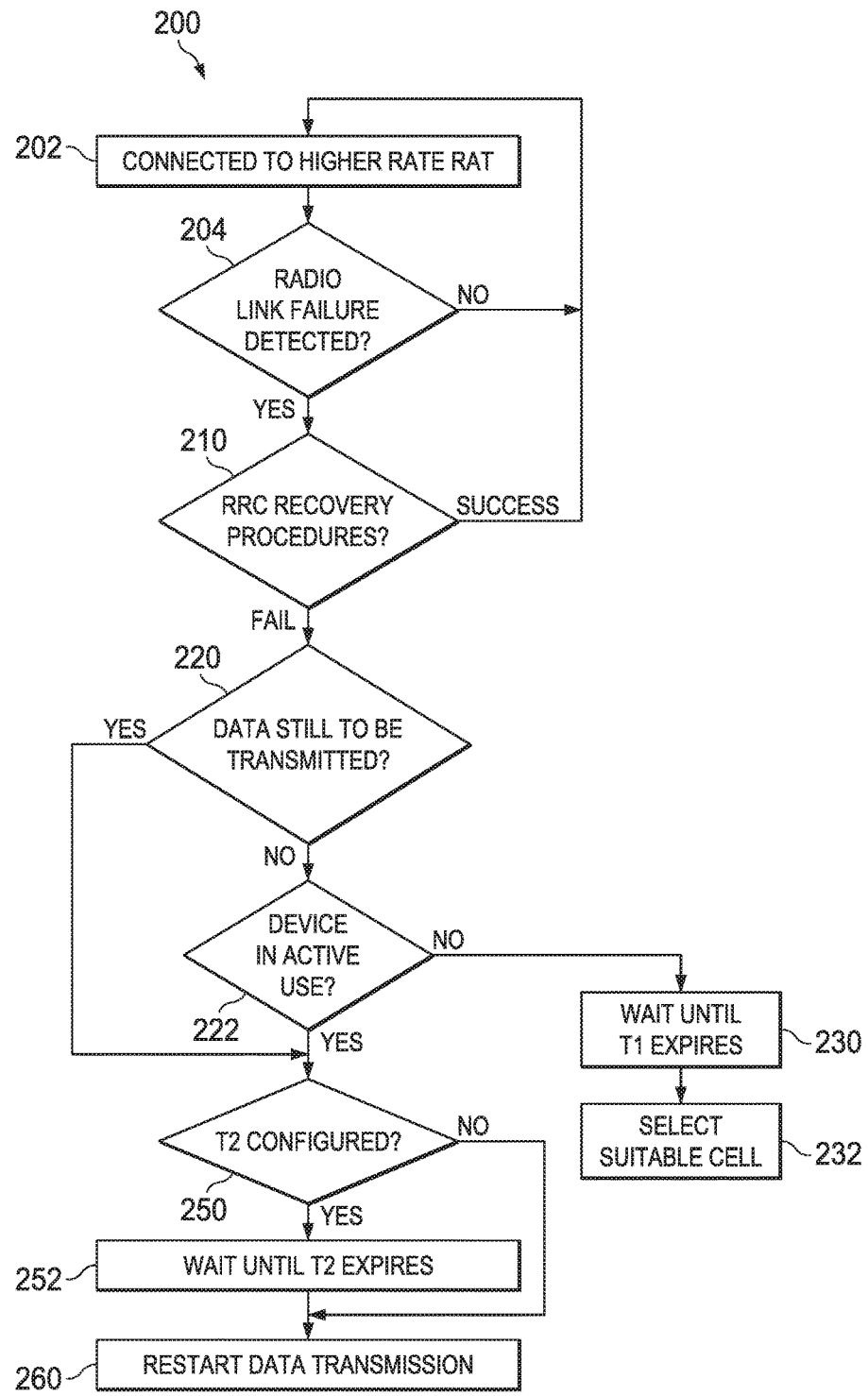
FIG. 2 is a flow diagram showing an example process for transmitting data over a RAT according to an implementation.

In some cases, after the UE loses connection over a higher rate RAT, the UE can perform a scan and find a lower rate RAT that is available. The UE can determine whether there is data queued up in the UE waiting transmission on the radio interface, whether the UE is in active use, or a combination thereof. If there is no data to be transmitted and the UE is not in active use, the UE can start a first timer T1. In some cases, the first timer T1 can be a hysteresis back-off timer. The UE can wait until T1 expires and select an available suitable cell. On the other hand, if there is data to be transmitted or the UE is in active use, the UE can initiate a connection with the network using the lower rate RAT without starting the first timer T1 or if T1 is started then without waiting for the first timer T1 to expire. Alternatively, the UE can start a second backoff timer T2 that is shorter than the first timer T1 and select a suitable cell for example on a lower rate or second RAT, after the second timer T2 expires. In some cases, a UE is in active use if a user interface of the UE is in use, e.g., the screen is on or the data entry keys are pressed. A UE can also be in active use if data input operation for an application associated with data transmission is ongoing, e.g., an application that sends requests for data transmission is waiting for a user input. FIG. 2 and associated descriptions provide additional details of these implementations.

Figure 3:
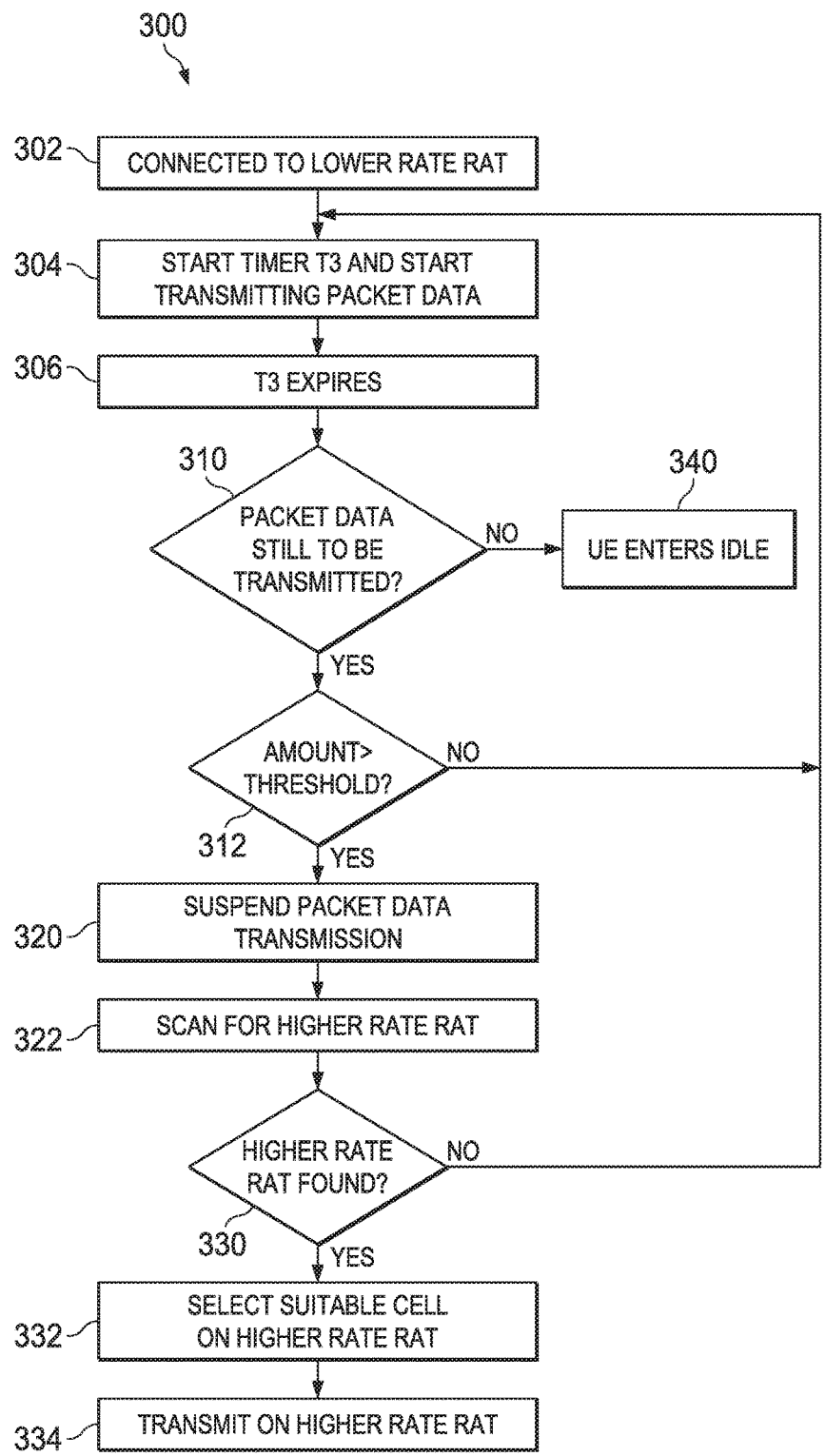
FIG. 3 is a flow diagram showing another example process for transmitting data over a RAT according to another implementation.

In some cases, when the UE initiates a data transmission using a lower rate RAT, the UE can start a transmission timer, T3. When the timer expires, the UE can determine whether there is data that remains to be transmitted. If there is data that remains to be transmitted, the UE can suspend the data transmission and initiate a search for a higher rate RAT. If the UE finds the higher rate RAT, the UE can resume data transmission over the higher rate RAT. If the UE does not find the higher rate RAT, the UE can reset and re-start the transmission timer T3 and continue to transmit the data over the lower rate RAT. In some cases, when reseting the timer the UE can set the timer to a different value. In some cases, the UE can determine whether to suspend the data transmission over the lower rate RAT based on the amount of remaining data when the timer expires. FIGS. 3-5 and associated descriptions provide additional details of these implementations. These approaches can provide the UE with more opportunities to discover and connect to the higher rate RAT in order to resume data transmission over the higher rate RAT, and therefore speed up the delivery of the data. An alternative to suspending the data transmission on expiry of transmission timer T3, is to suspend the data and for the UE to temporarily act as in idle mode or alternatively for the UE to temporarily go to idle mode in the lower rate RAT, but without deleting the data still to be transmitted. In this alternative during the temporary idle mode the UE scans for a higher rate RAT. If the UE finds a suitable cell on the higher rate RAT then the UE selects and establishes a connection to the cell and resumes the data transmission on the higher rate RAT. If the UE is unable to find a suitable cell on the higher rate RAT then the UE resumes the data transmission on the lower rate RAT.

FIG. 1 illustrates an example communication system 100 that transmits data over a RAT according to an implementation. At a high level, the example communication system 100 includes a UE 102 that is communicably coupled to a network 110, which includes a base station 104 that is configured to communicate with the UE 102. The UE can transmit data to the network 110 over a first RAT 120 or a second RAT 130.

The example communication system 100 includes the network 110. The network 110 represents an application, set of applications, software, software modules, hardware, or combination thereof that can be configured to transfer data with, including transmitting to, receiving from, or a combination thereof, the UE 102. The network 110 includes a wireless network, a wireline network, or a combination thereof. For example, the network 110 can include one or a plurality of radio access networks (RANs), core networks (CNs), and external networks. The RANs may comprise one or more radio access technologies. In some implementations, the radio access technologies can be Global System for Mobile communication (GSM), General Packet Radio Service (GPRS), Enhanced Data rates for GSM Evolution (EDGE), Interim Standard 95 (IS-95), Code Division Multiple Access (CDMA)2000, Evolution-Data Optimized (EVDO), Universal Mobile Telecommunications System (UMTS), Long Term Evolution (LTE), LTE-Advanced (LTE-A), wireless broadband communication technologies, or any combinations thereof. Examples of wireless broadband communication technologies include IEEE 802.11 wireless local area network (WLAN), IEEE 802.16 WiMAX, and others.

A RAN is part of a wireless telecommunication system which implements a radio access technology. In many applications, a RAN includes at least one base station, e.g., the base station 104. A base station can control all or at least some radio-related functions in a fixed part of the system. The base station may provide for a radio interface within its coverage area or a cell for a mobile device to communicate. The base station may be distributed throughout the cellular network to provide a wide area of coverage. The base station directly communicates to one or a plurality of mobile devices, other base stations, and one or more core network nodes. In some cases, a base station can be configured to provide one or more RATs. In some implementations, the network 110 can include a first base station that can provide a higher rate RAT in a first cell, and a second base station that can provide a lower rate RAT in a second cell. Therefore, if the UE 102 is located in a first cell, the UE 102 can connect to the network 110 using the higher rate RAT provided by the first base station. If the UE 102 moves to a different geographic area, e.g., the second cell, the UE 102 can connect to the network 110 using the lower rate RAT provided by the second base station.

Turning to a general description, a UE, e.g., the UE 102, may include, without limitation, any of the following: computing device, mobile device, mobile electronic device, user device, mobile station, subscriber station, portable electronic device, mobile communications device, wireless modem, wireless terminal, or other electronic device. Examples of a mobile device may include a cellular phone, personal data assistant (PDA), smart phone, laptop, tablet, personal computer (PC), pager, portable computer, portable gaming device, wearable electronic device, health/medical/fitness device, camera, or other mobile communications devices having components for communicating voice or data via a wireless communication network. The wireless communication network may include a wireless link over at least one of a licensed spectrum and an unlicensed spectrum. The term "UE" can also refer to any hardware or software component that can terminate a communication session for a user. In addition, the terms "user equipment," "UE," "user equipment device," "user agent," "UA," "user device," and "mobile device" can be used synonymously herein.

In operation, the UE 102 initiates a data transmission using the first RAT 120. The UE 102 starts a transmission timer T3 at a first value. When the timer expires, the UE 102 determines that data remains to be transmitted. In response to determining that data remains to be transmitted, the UE 102 suspends the data transmission. The UE 102 initiates a search for the second RAT 130 for transmitting the remaining data. In some cases, the second RAT 130 provides a higher data rate than the first RAT 120. For example, the first RAT 120 is a 2G or 3G RAT and the second RAT is a 4G RAT. Alternatively or additionally, the second RAT can have one or more other characteristics that make it preferable for the continuation of the data transmission over the first RAT. Examples of these characteristics can include cost, less impact to RAT capacity, data transfer rate, and cell coverage. If the UE 102 detects a suitable cell on the second RAT 130 during the search, the UE 102 establishes a radio bearer using the second RAT 130. The UE 102 transmits the remaining data over the radio bearer using the second RAT 130. If the UE 102 fails to detect the second RAT 130, e.g. following a full band scan of all the bands supported by the UE, or a defined time scan or any other scanning procedure, the UE 102 resets the transmission timer and continues to transmit the remaining data using the first RAT 120. FIGS. 3-7 and associated descriptions provide additional details of these implementations.

While elements of FIG. 1 are shown as including various component parts, portions, or modules that implement the various features and functionality, these elements may instead include a number of sub-modules, third-party services, components, libraries, and such, as appropriate. Furthermore, the features and functionality of various components can be combined into fewer components as appropriate.

FIG. 2 is a flow diagram showing an example process 200 for transmitting data over a RAT according to an implementation. The process 200 can be implemented by a mobile device, e.g., the UE 102 shown in FIG. 1. The process 200 shown in FIG. 2 can also be implemented using additional, fewer, or different entities. Furthermore, the process 200 shown in FIG. 2 can also be implemented using additional, fewer, or different operations, which can be performed in the order shown or in a different order.

The example process 200 begins at 202, where a UE is connected to a base station over a higher rate RAT, e.g., LTE. The UE can transmit or receive packet data over the higher rate RAT. At 204, the UE determines whether a RLF is detected. A RLF can occur when the physical channel or the physical connection with a base station over the current RAT is lost. If RLF is not detected, the process returns to 202 where the UE continues to transmit or receive packet data over the higher rate RAT.

If RLF is detected, at 210, the UE performs an RRC recovery procedure. In one example, if data transfer had been initiated prior to the detection of RLF, for example Access Stratum (AS) security had been activated, the UE can perform RRC connection reestablishment procedure including starting a reestablishment timer e.g. T311, and attempting to reestablish the RRC connection on the higher rate RAT before the reestablishment timer expires. If the RRC recovery procedure, e.g., the RRC connection reestablishment is successful, the UE can return to 202, and continue the data transmission with the network using the higher rate RAT using the re-established RRC connection. If the RRC recovery procedure fails, for example if the UE has not been able to reestablish the RRC connection to the original RAT when the reestablishment timer expires, the UE suspends any data transmission and proceeds to 220, where the UE determines whether there is data in the transmission queue of the UE to be transmitted. If there is data remaining in the queue, process 200 proceeds from 220 to 250, where the UE determines whether a back-off timer T2 is configured.

In some cases, before the UE determines whether the back-off timer T2 is configured, the UE can determine if a hysteresis back-off timer T1 is configured. The hysteresis back-off timer T1 can add a delay period for the UE to select a suitable cell on an alternative RAT other than the RAT of the higher rate RAT, following failure by the UE to reestablish its connection to the higher rate RAT and having initiated the scan. If the UE determines that the hysteresis back-off timer T1 is configured, process 200 can proceed to 250 and determine whether an alternative back-off timer T2 is configured. In some cases, if the hysteresis back-off timer T1 is not configured, process 200 can skip 250 and 252, and proceed directly to 260. Table 1 provides an example description of different timers.

TABLE 1

Timer descriptions Timer

| Timer | |
|---|---|
| Reestablishment timer, T311 | Timer started when UE detects radio link failure, and UE initiates reestablishment procedure |
| hysteresis backoff timer, T1 | Timer started following loss of coverage when UE initiates scan for suitable cell to provide more time to find cell of higher rate RAT or of a first type and to delay until T1 expires selection of RAT of a second type or lower rate |
| Back-off timer, T2 | T2 < T1. Started when UE with hysteresis backoff timer T1 detects out of coverage and has data to transmit or the UE is in active use, also started following loss of coverage when UE initiates scan for suitable cell in order to avoid delay in cell selection, e.g. due to timer T1 |
| Transmission timer, T3 | Started when UE on RAT of a second type or lower rate RAT starts data transmission. On expiry UE suspends data transmission or moves to idle and begins search for RAT of first type or higher rate RAT |

If the back-off timer T2 is configured, process 200 proceeds from 250 to 252, where the UE starts the back-off timer T2 and continues to scan for a suitable cell. If the UE finds a suitable cell of the higher rate RAT whilst T2 is running, the UE can stop T2, select the suitable cell and establish an RRC Connection through which the UE can continue the data transmission with the network using the higher rate RAT. When the back-off timer T2 expires, if the UE has found a suitable cell on a lower rate RAT, the UE can select the suitable cell on the lower rate RAT. At 260 the UE resumes data transmission to the selected suitable cell of the lower rate RAT and transmits the remaining data. By waiting for the back-off timer T2 to expire, the UE has additional opportunities to find a higher rate RAT to transmit the remaining data. In some cases, the back-off timer T2 can be set to a value that is smaller than the hysteresis back-off timer. Therefore, the wait time in 252 can be reduced if there is data to transmit or the UE is in active use.

If the back-off timer T2 is not configured, but data is detected in the transmission queue in the UE, process 200 proceeds from 250 to 260, in this case, the UE can select an available suitable cell and resume data transmission to the available suitable cell without waiting for the back-off timer T2 to expire. This may result in the UE selecting a suitable cell on a lower rate RAT. By not waiting for the back-off timer T2 to expire, the UE can resume data transmission sooner, as soon as a suitable cell of any RAT supported by the UE is found.

If the UE determines that there is no data to be transmitted, process 200 proceeds from 220 to 222, where the UE determines whether the UE is in active use. Alternatively or additionally, if the UE determines that there is data to be transmitted at 220, but the amount of data to be transmitted is below a threshold, the process 200 can also proceed from 220 to 222. In some implementations, the UE can determine that the UE is in active use by detecting that a user interface of the UE is in use, e.g., the screen is on or the data entry keys are pressed. The UE can also be determined to be in active use if data input operation for an application associated with data transmission is ongoing, e.g., an application that sends requests for data transmission is waiting for a user input. In some cases, if the UE is in active use, there may be a higher chance that the UE may be about to transmit data. Therefore, a UE that is in active use can be treated as the same scenario as if there is data to be transmitted.

If the UE determines that the UE is in active use, process 200 proceeds from 222 to 250, where the UE determines if back-off timer T2 is configured. As discussed previously, if T2 is configured, the UE scans for a high rate RAT as well as other UE supported types of RAT and may wait until T2 expires to select a suitable cell of a lower rate RAT. If T2 is not configured, the UE can select a suitable cell and connect to the suitable cell.

If the UE is determined to not be in active use, process 200 proceeds from 222 to 230, where the UE starts the hysteresis back-off timer T1. In some implementations, step 222 can be skipped and process 200 can proceed from 220 to 230 if there is no data to be transmitted. The UE continues to scan for a suitable cell whilst T1 is running. If the UE finds a suitable cell of the higher rate RAT whilst T1 is running, the UE can stop T1, select the suitable cell, and establish an RRC connection to the high rate RAT. If, when the hysteresis back-off timer T1 expires, at 232, the UE has not found a suitable cell of the high rate RAT then the UE selects a suitable cell on another RAT type supported by the UE. The suitable cell can be a higher rate RAT or a lower rate RAT.

In some implementations, the timers T1 and T2 can be set to different values. For example, T1 is set to a longer period than T2. Therefore, if there is no data to be transmitted and the UE is not in active use, the UE can wait for a longer period before selecting a suitable cell. By waiting for a longer period, the UE may have a higher chance to select a cell from a higher rate RAT; and because the UE has no data to transmit and the UE is not in active use, the user experience may not be affected. On the other hand, if there is data to be transmitted or the UE is in active use, the UE can wait for a shorter period before selecting a suitable cell, or can select the suitable cell without waiting (e.g., T2 not configured or T2 set to 0). Therefore, the UE can start transmission sooner.

In some cases, the back-off timers T1 or T2 can be configured by a user of the UE, a device manufacturer of the UE, a network administrator, or a combination thereof. In some implementations, whether a RAT is classified as a higher rate RAT or a lower rate RAT can be configured by a user of the UE, a device manufacturer of the UE, a network administrator, or a combination thereof. The values of the back-off timers may be signaled to a UE via the network using dedicated, common, or broadcast signaling when operating under one or more RATs. Alternatively or additionally, whether a RAT is classified as a higher RAT or a lower RAT, the back-off timers T1 and T2, or any combinations thereof, can be specified in a wireless communication standard.

FIG. 3 is a flow diagram showing another example process 300 for transmitting data over a RAT according to another implementation. The process 300 can be implemented by a mobile device, e.g., the UE 102 shown in FIG. 1. The process 300 shown in FIG. 3 can also be implemented using additional, fewer, or different entities. Furthermore, the process 300 shown in FIG. 3 can also be implemented using additional, fewer, or different operations, which can be performed in the order shown or in a different order.

The example process 300 begins at 302, where a UE is connected to a base station over a lower rate RAT, e.g., CDMA2000, EDGE, GPRS, or UMTS. In some cases, the UE can connect to the base station over a lower rate RAT after the RLF and a suitable cell search, e.g., discussed in the process 200. Alternatively or additionally, the UE can connect to the base station over a lower rate RAT because the UE has selected the cell using the lower rate RAT during an initial cell search procedure.

At 304, the UE starts to transmit data over the lower rate RAT. The UE also starts a transmission timer T3 that is set to a configured value. In some cases, the UE can start the timer T3 when the first Packet Data Unit (PDU) is transmitted over the lower rate RAT. At 306, the timer T3 expires. At 310, the UE determines whether there is packet data that remains to be transmitted. If there is no packet data that remains to be transmitted, e.g., the UE has completed transmission during the period set by T3, process 300 proceeds from 310 to 340, where the UE if not already in an RRC idle state enters RRC idle state or other network controlled radio state or mode. During this RRC idle state or other network controlled radio state or mode, the UE may initiate a scan to search for a suitable cell, e.g., a cell that supports a higher rate RAT. If the packet data transmission completes before the timer T3 expires, then the device follows the normal call termination steps, returning to idle and at the same time stopping or cancelling the timer T3.

If the UE determines that there is data to be transmitted, process 300 proceeds from 310 to 312, where the UE determines whether the amount of remaining data to be transmitted is greater than a threshold. If the amount of remaining data is not greater than the threshold, process 300 proceeds from 312 to 304, where the UE starts the transmission timer T3 and continues to transmit the remaining data over the lower rate RAT If the amount of remaining data is greater than the threshold, process 300 proceeds from 312 to 320, where the UE suspends the data transmission over the lower rate RAT. At 322, the UE scans for a higher rate RAT. In some cases, the UE can transition to the RRC idle state to perform the scanning. Alternatively or additionally, the UE can stay in an RRC connected state and perform the scan operation that is similar to the scan operation performed in a RRC idle state. At 330, the UE determines if the higher rate RAT is found. If a suitable cell of the high rate RAT is found, process 300 proceeds from 330 to 332, where the UE selects a suitable cell that supports the higher rate RAT. At 334, the UE transmits the remaining data to the selected cell using the higher rate RAT. The UE can attach to the selected cell and establish a radio bearer over the higher rate RAT prior to resuming data transmission.

If the UE determines that a higher rate RAT is not found during the scan, process 300 proceeds from 330 to 304, where the UE resets the transmission timer T3 to a configured value, starts the timer T3, and continues to transmit the remaining data over the lower rate RAT. In some cases, the UE can establish or reestablish the radio bearer for the suspended packet data session in order to resume the transmission. If the UE is unable to resume the packet data transmission on the lower rate RAT, the UE may stay in the RRC idle state and scan for a suitable cell of any RAT type supported by the UE for data transmission.

In some cases, the transmission timer T3 can be reset to the same configured value every time the UE returns to 304 after failing to find the higher rate RAT at 330. Alternatively or additionally, the UE can reset the timer T3 to a different value, for example, depending on the number of unsuccessful scans that the UE has performed at 330 in the same data session. In one example, the timer T3 can be set based on the amount of data that remains to be transmitted. For example, if the amount of remaining data exceeds a threshold, the timer T3 can be set to a smaller value. If the amount of remaining data is less than or equal to a threshold, the timer T3 can be set to a larger value. In some cases, more than one value can be configured. Each value corresponds to a threshold. If the amount of remaining data is larger than a first threshold and smaller than a second threshold, the timer T3 is set to a value corresponding to the first threshold.

In another example, the timer T3 can be set based on the number of times the UE returns to 304 after failing to find the higher rate RAT at 330. For example, a counter can be maintained for each time the UE enters 304 and starts T3 in a data session. The first time the UE starts T3, T3 can be set to an initial value. When the UE starts T3 again after failing to find the higher rate RAT at 330, T3 can be set to a value that is longer than the initial value.

For example, one set of values for the transmission timer T3 may consist of 30, 60, 120, 240, 480, 960, 960, 960, etc. seconds, can be configured for each time the UE returns to 304 in the same data transmission session. At the time of resuming the packet data transfer following an unsuccessful scan, the device (re)starts the transmission timer T3. The duration of the timer on (re)starting may be the same length or as described, e.g. different to the length as used in the first (or previous) instance of running the timer.

In some cases, different T3 timer values and scanning algorithms can be used in different iterations of scanning in the same data session. Following is an example sequence:
1. Initiate transmission of data on low throughput RAT.
2. Set the first instance of T3 at 30 seconds: on expiry of T3 (Scan #1), scan for higher throughput cells from the most recently used higher rate RAT systems.
3. If scan is unsuccessful, resume/continue packet data transmission on the lower throughput RAT.
4. Set the next instance of T3 for 60 seconds: on expiry of T3 (Scan #2), repeat Scan #1, and then scan for the higher throughput RAT bands or carrier frequencies in all registered PLMNs. Alternatively, the scan can be performed on the higher throughput RAT bands or carrier frequencies in all Home Country PLMNs.
5. If scan is unsuccessful, resume/continue packet data transmission on the lower throughput RAT.
6. Set the next instance of T3 for 120 seconds and again thereafter on unsuccessful scans e.g. wherein the original packet data transmission is not complete: and on each expiry of T3 repeat Scan #2.

As mentioned above other variations in timer values T3 on successive restarts can be used, as can variations in scanning algorithms for detection of the higher throughput RAT and behaviours relating to starting or not starting T3 on unsuccessful scans for higher throughput RATs. The scans carried out on expiry of T3 may alternatively or additionally be time limited, either fixed in the device or determined based on the amount of data left to transmit, upon the suspension of the data transmission 320. By limiting the time for the scan the interruption to the data transmission is limited, which may be advantageous if the device supports multiple other RATs and frequency bands which would require scanning. In some cases, once the UE completes the data session, T3 can be reset to the initial value, e.g., 30 seconds.

If the device is unable to resume the packet data transfer on the lower rate RAT after not finding the higher rate RAT, then the device will remain in Idle and scan for a suitable cell of any RAT supported by the device on any supported band, until it is able to establish connection to a suitable cell on any RAT.

In some cases, the threshold determination at 310 can be skipped. For example, process 300 can proceed from 310 to 320 if there is data that remains to be transmitted. The UE can suspend data transmission and scan for a higher rate RAT.

In some cases, the value or multiple values of T3, the data threshold or multiple data thresholds, or a combinations thereof, can be configured by a user of the UE, a device manufacturer of the UE, a network administrator, or a combination thereof. In some implementations, whether a RAT is classified as a higher rate RAT or a lower rate RAT can be configured by a user of the UE, a device manufacturer of the UE, a network administrator, or a combination thereof. For example, one or more of these values can be hard coded into the device during manufacture or implementation, or they can be sent to the UE via signaling from the network, e.g., AS or NAS signaling, or they can be configured by a user via a user interface and a data entry method attached to the UE. A network can signal one or more of these values using a broadcast signal in a cell, which a UE can read during acquisition of the cell. Alternatively or additionally, a network can use dedicated signaling, e.g., RRC configuration information to indicate one or more of these values to the UE. These values can be signaled in an information element (IE) in messages that are used to establish the radio bearers or channels for packet data transmission. Examples of these messages for an EUTRA network include the RRCConnectionReconfiguration message. Alternatively or additionally, the IE can be included in a new RRC message. One or more of these values can be included in an existing IE, e.g., rlf-TimersAndConstants IE, or a new IE. FIG. 4 illustrates an example IE 400 that can be used to indicate T3 values. As shown in FIG. 4, the rlf-TimersAndConstants IE 400 includes multiple values, from 30 s to 960 s, for the timer T3 (e.g. t31x-r14).

In some cases, an IE can be used to configure both the different data thresholds and their corresponding T3 values described previously. FIGS. 5A and 5B illustrate an example IE 500 that can be used to indicate data thresholds and T3 values. As shown in FIGS. 5A and 5B, the PDCP-Config UE 500 includes data thresholds (e.g. BackoffThreshold-r14) from 0 kb to 12,800 kb, and the T3 (e.g. t-backoffT3-r14) values corresponding to these data thresholds.

In some cases, these values can be sent by the network over the higher rate RAT. Alternatively or additionally, these values can be encoded and sent by the network over the lower rate RAT. In some cases, the UE can be configured to use the values signaled over the higher rate RAT or the lower rate RAT when these values differ. Alternatively or additionally, the network or a wireless communication standards can specify which set of values can be used.

Alternatively or additionally, the value or multiple values of T3, the data threshold or multiple data thresholds, whether a RAT is classified as a higher RAT or a lower RAT, or any combinations thereof, can be specified in a wireless communication standard and signaled from a network or hard coded in the UE.

Figure 6:
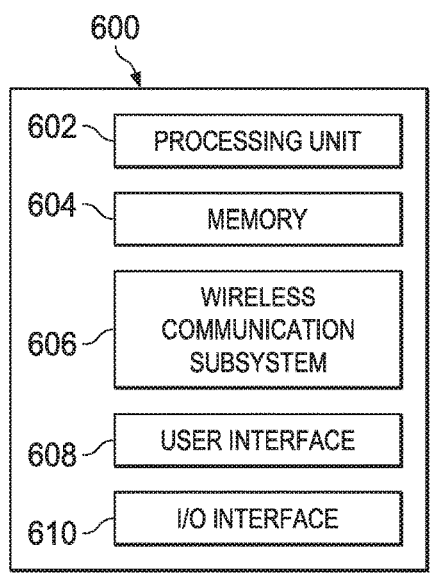
FIG. 6 is a block diagram illustrating an example user equipment (UE) device according to an implementation.

FIG. 6 is a block diagram illustrating an example user equipment (UE) device 600 according to an implementation. The illustrated device 600 includes a processing unit 602, a memory 604 (for example, ROM or flash memory), a wireless communication subsystem 606, a user interface 608, and an I/O interface 610.

The processing unit 602 can include one or more processing components (alternatively referred to as "processors" or "central processing units" (CPUs)) configured to execute instructions related to one or more of the processes, steps, or actions described above, in connection with one or more of the implementations disclosed herein. In some implementations, the processing unit 602 can be configured to generate control information, such as a measurement report, or respond to received information, such as control information from a network node. In some cases, the processing unit 602 can also be configured to make a radio resource management (RRM) decision, such as cell selection/reselection information or trigger a measurement report. The processing unit 602 can also include other auxiliary components, such as random access memory (RAM) and read-only memory (ROM).

The memory 604 can be a computer-readable storage medium on the device 600. Examples of the memory 604 include volatile and non-volatile memory, magnetic media, optical media, random access memory (RAM), read-only memory (ROM), removable media, and others. The memory 604 can store an operating system (OS) of the device 600 and various other computer-executable software programs for performing one or more of the processes, steps, or actions described above.

The communication subsystem 606 can be configured to provide wireless or wireline communication for data or control information provided by the processing unit 602. The communication subsystem 606 can include, for example, one or more antennas, a receiver, a transmitter, a local oscillator, a mixer, and a digital signal processing (DSP) unit. In some implementations, the communication subsystem 606 can support multiple input multiple output (MIMO) transmissions. In some implementations, the receivers in the communication subsystem 606 can be an advanced receiver or a baseline receiver. Two receivers can be implemented with identical, similar, or different receiver processing algorithms.

The user interface 608 can include, for example, any of the following: one or more of a display or touch screen display (for example, a liquid crystal display (LCD), a light emitting display (LED), an organic light emitting display (OLED), or a micro-electromechanical system (MEMS) display), a keyboard or keypad, a trackball, a speaker, or a microphone. The I/O interface 610 can include, for example, a universal serial bus (USB) interface.

Various other components can also be included in the device 600. A number of embodiments of the invention have been described. Nevertheless, it will be understood that various modifications may be made. Accordingly, other embodiments are within the scope of the following claims.

Figure 7:
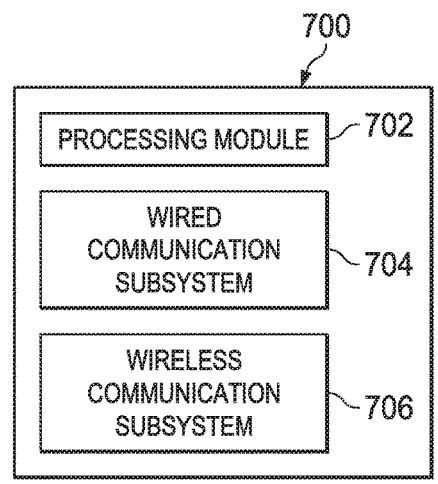
FIG. 7 is a block diagram illustrating an example base station according to an implementation.

FIG. 7 is a block diagram illustrating an example base station 700 according to an implementation. The illustrated base station 700 includes a processing module 702, a wired communication subsystem 704, and a wireless communication subsystem 706. The wireless communication subsystem 706 can receive data traffic and control traffic from a UE. In some implementations, the wireless communication subsystem 706 may include a receiver and a transmitter. The wired communication subsystem 704 can be configured to transmit and receive control information between other access node devices via backhaul connections. The processing module 702 can include one or more processing components (alternatively referred to as "processors" or "central processing units" (CPUs)) capable of executing instructions related to one or more of the processes, steps, or actions described above in connection with one or more of the implementations disclosed herein. The processing module 702 can also include other auxiliary components, such as random access memory (RAM), read-only memory (ROM), secondary storage (for example, a hard disk drive or flash memory). In some implementations, the processing module 702 may be configured to generate control information or respond to received information, such as a measurement report transmitted from a UE. The processing module 702 may also be configured to make an RRM decision based at least in part on the information transmitted from the UE, such as cell selection/reselection information or the measurement report. The processing module 702 can execute certain instructions and commands to provide wireless or wired communication, using the wired communication subsystem 704 or a wireless communication subsystem 706. Various other components can also be included in the base station 700.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data-processing apparatus," "computer," or "electronic computer device" encompass all kinds of apparatus, devices, and machines for processing data, including, by way of example, a programmable processor, a computer, a system on a chip, or multiple ones, or combinations of the foregoing. The apparatus can include special purpose logic circuitry, e.g., an FPGA (field programmable gate array) or an ASIC (application specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable, conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site, or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

Some of the processes and logic flows described in this disclosure can be performed by one or more programmable processors, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices, for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including, by way of example, semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry. In some cases, the computer storage medium can be transitory, non-transitory, or a combination thereof.

To provide for interaction with a user, implementations of the subject matter described in this disclosure can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to, and receiving documents from a device that is used by the user, for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system, or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an application programming interface (API) or a service layer (or a combination of API and service layer). The API may include specifications for routines, data structures, and object classes. The API may be either computer language, independent or dependent, and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

What is claimed is:

1. A method, comprising:
    initiating, at a mobile device, a data transmission using a first radio access technology (RAT);
    starting, at the mobile device, a timer at a first value;
    when the timer expires, determining, at the mobile device, that data remains to be transmitted; and
    in response to determining that data remains to be transmitted:
        suspending, at the mobile device, the data transmission;
        initiating, by the mobile device, a search for a second RAT for transmitting the remaining data, wherein the second RAT provides a higher data rate than the first RAT;
        detecting, at the mobile device, the second RAT during the search;
        in response to detecting the second RAT, establishing, by the mobile device, a radio bearer using the second RAT; and
        transmitting, by the mobile device, the remaining data over the radio bearer using the second RAT.

2. The method of claim 1, wherein the timer is started in response to determining that the first RAT is at least one of Global System for Mobile communication (GSM), General Packet Radio Service (GPRS), Enhanced Data rates for GSM Evolution (EDGE), Interim Standard 95 (IS-95), Code Division Multiple Access (CDMA2000), Evolution-Data Optimized (EVDO), or Universal Mobile Telecommunications System (UMTS).

3. The method of claim 1, further comprising:
    in response to not detecting the second RAT:
        resetting the timer; and
        transmitting the remaining data using the first RAT.

4. The method of claim 3, wherein the timer is reset to a second value that is different than the first value.

5. The method of claim 4, wherein the second value is selected based on an amount of the remaining data.

6. The method of claim 1, further comprising:
    in response to determining that data remains to be transmitted:
        determining that an amount of the remaining data is greater than a threshold; and
        suspending the data transmission in response to determining that the amount of the remaining data is greater than the threshold.

7. The method of claim 1, further comprising: receiving the first value for the timer in a Radio Resource Control (RRC) message.

8. A mobile device, comprising:
    a memory; and
    at least one hardware processor communicatively coupled with the memory and configured to:
        initiate, at the mobile device, a data transmission using a first radio access technology (RAT);
        start, at the mobile device, a timer at a first value;
        when the timer expires, determine, at the mobile device, that data remains to be transmitted; and
        in response to determining that data remains to be transmitted:
            suspend, at the mobile device, the data transmission;

initiate, by the mobile device, a search for a second RAT for transmitting the remaining data, wherein the second RAT provides a higher data rate than the first RAT;

detect, at the mobile device, the second RAT during the search;

in response to detecting the second RAT, establish, by the mobile device, a radio bearer using the second RAT; and transmit, by the mobile device, the remaining data over the radio bearer using the second RAT.

9. The mobile device of claim 8, wherein the timer is started in response to determining that the first RAT is at least one of Global System for Mobile communication (GSM), General Packet Radio Service (GPRS), Enhanced Data rates for GSM Evolution (EDGE), Interim Standard 95 (IS-95), Code Division Multiple Access (CDMA2000), Evolution-Data Optimized (EVDO), or Universal Mobile Telecommunications System (UMTS).

10. The mobile device of claim 8, wherein the at least one hardware processor is further configured to:

in response to not detecting the second RAT:
reset the timer; and
transmit the remaining data using the first RAT.

11. The mobile device of claim 10, wherein the timer is reset to a second value that is different than the first value.

12. The mobile device of claim 11, wherein the second value is selected based on an amount of the remaining data.

13. The mobile device of claim 8, wherein the at least one hardware processor is further configured to:

in response to determining that data remains to be transmitted:
determine that an amount of the remaining data is greater than a threshold; and
suspend the data transmission in response to determining that the amount of the remaining data is greater than the threshold.

14. The mobile device of claim 8, wherein the at least one hardware processor is further configured to: receive the first value for the timer in a Radio Resource Control (RRC) message.

15. A non-transitory computer-readable medium containing instructions which, when executed, cause a mobile device to perform operations comprising:

initiating, at the mobile device, a data transmission using a first radio access technology (RAT);

starting, at the mobile device, a timer at a first value;

when the timer expires, determining, at the mobile device, that data remains to be transmitted; and in response to determining that data remains to be transmitted:
suspending, at the mobile device, the data transmission;
initiating, by the mobile device, a search for a second RAT for transmitting the remaining data, wherein the second RAT provides a higher data rate than the first RAT;
detecting, at the mobile device, the second RAT during the search;
in response to detecting the second RAT, establishing, by the mobile device, a radio bearer using the second RAT; and
transmitting, by the mobile device, the remaining data over the radio bearer using the second RAT.

16. The non-transitory computer-readable medium of claim 15, wherein the timer is started in response to determining that the first RAT is at least one of Global System for Mobile communication (GSM), General Packet Radio Service (GPRS), Enhanced Data rates for GSM Evolution (EDGE), Interim Standard 95 (IS-95), Code Division Multiple Access (CDMA2000), Evolution-Data Optimized (EVDO), or Universal Mobile Telecommunications System (UMTS).

17. The non-transitory computer-readable medium of claim 15, the operations further comprising:

in response to not detecting the second RAT:
reseting the timer; and
transmitting the remaining data using the first RAT.

* * * * *

UNITED STATES PATENT AND TRADEMARK OFFICE
CERTIFICATE OF CORRECTION

PATENT NO. : 9,838,923 B1
APPLICATION NO. : 15/256301
DATED : December 5, 2017
INVENTOR(S) : Renato Sitton et al.

Page 1 of 1

It is certified that error appears in the above-identified patent and that said Letters Patent is hereby corrected as shown below:

In the Claims

Column 16, Line 39, In Claim 3, delete "reseting" and insert -- resetting --, therefor.

Column 18, Line 37, In Claim 17, delete "reseting" and insert -- resetting --, therefor.

Signed and Sealed this
Twenty-seventh Day of February, 2018

Andrei Iancu
*Director of the United States Patent and Trademark Office*